Oct. 23, 1951 — J. S. PANOSIAN — 2,572,189
FILM HOLDER FOR USE IN PHOTOGRAPHIC CAMERAS
Original Filed Jan. 3, 1948 — 2 SHEETS—SHEET 1
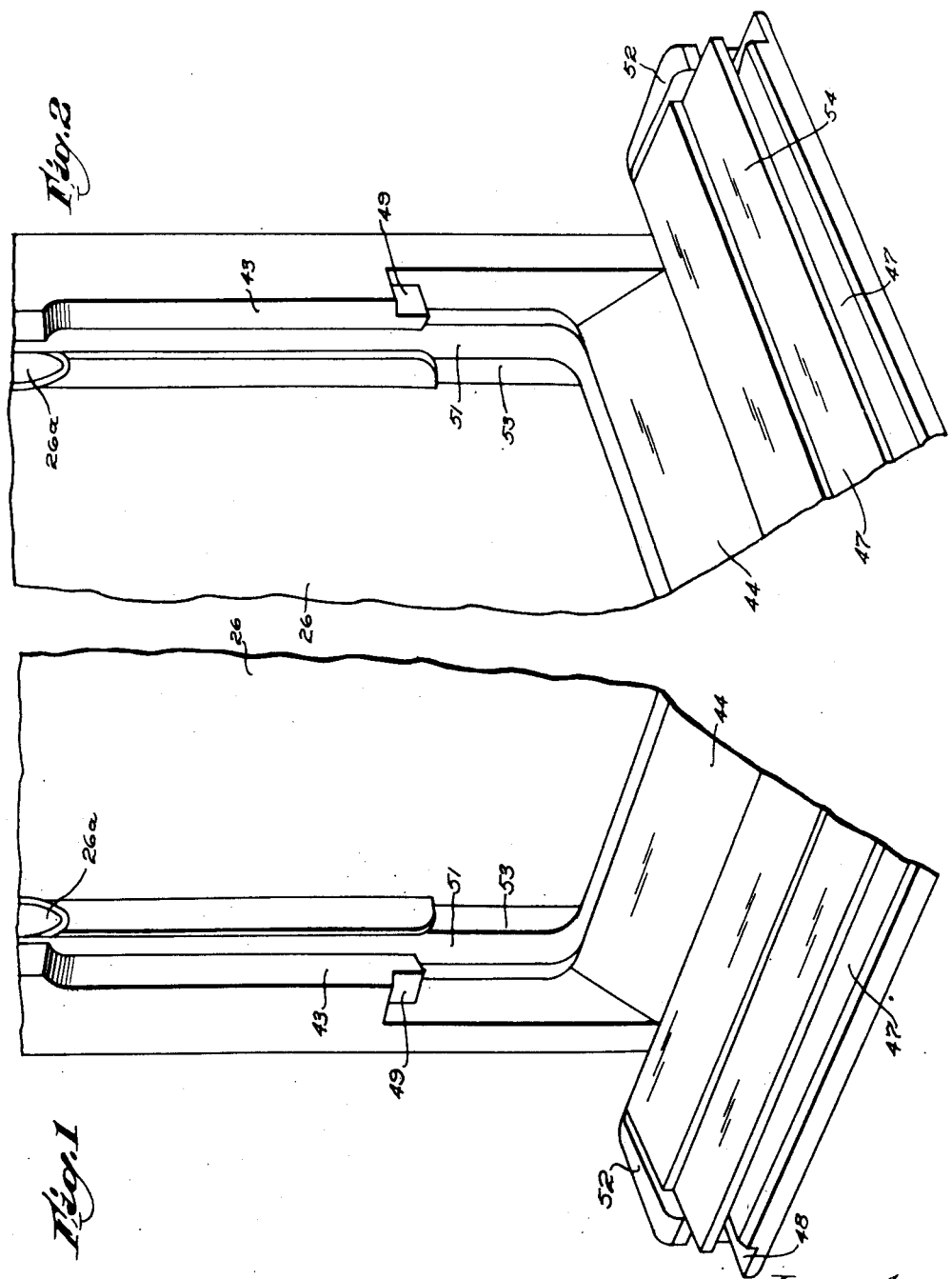

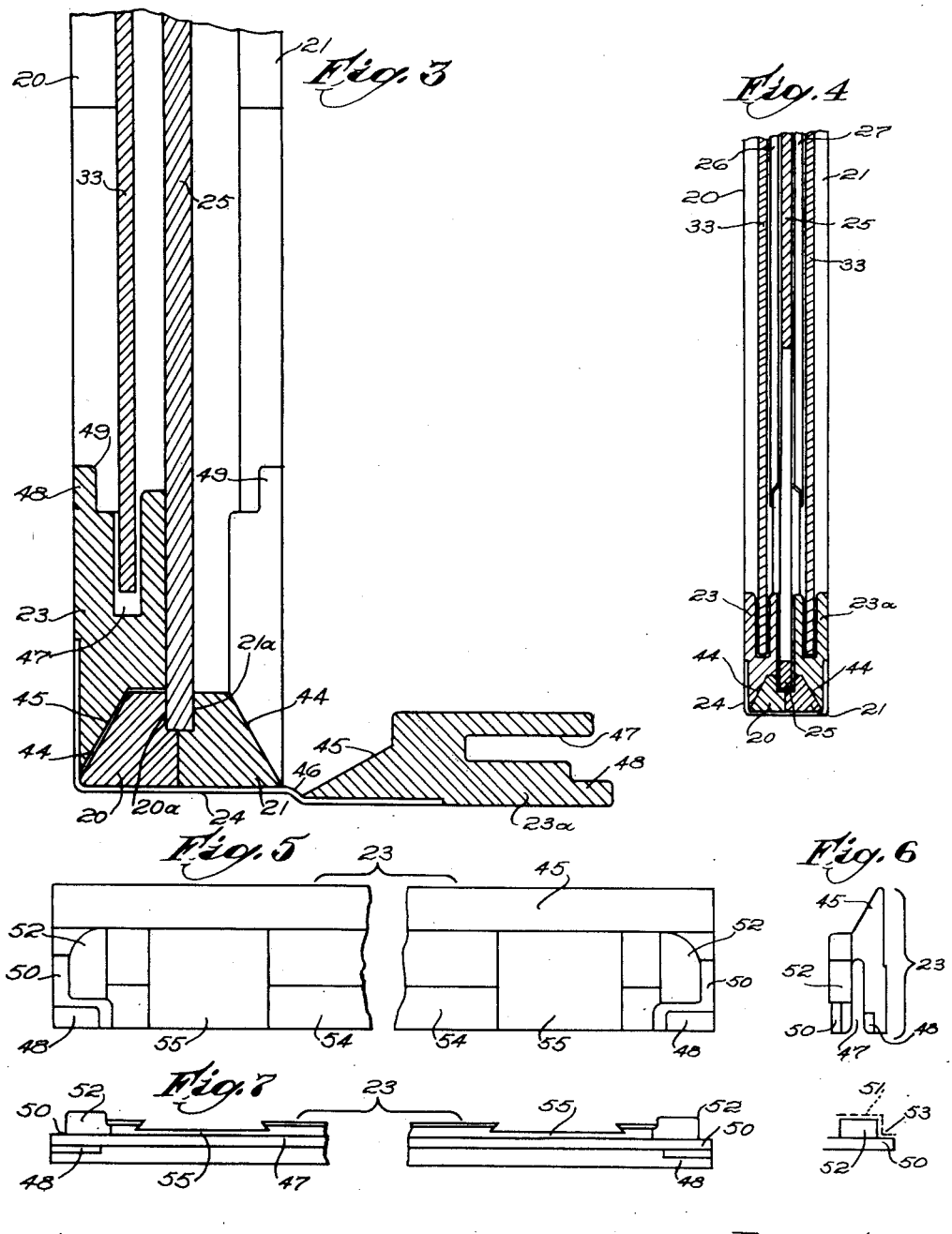

Patented Oct. 23, 1951

2,572,189

UNITED STATES PATENT OFFICE 2,572,189

FILM HOLDER FOR USE IN PHOTOGRAPHIC CAMERAS

James S. Panosian, Rochester, N. Y., assignor to Graflex, Inc., Rochester, N. Y., a corporation of Delaware Original application January 3, 1948, Serial No. 463, now Patent No. 2,497,270, dated February 14, 1950. Divided and this application December 14, 1949, Serial No. 132,914

14 Claims. (Cl. 95—66)

This application is a division of my co-pending application Ser. No. 463, filed January 3, 1948, now Patent No. 2,497,270, dated February 14, 1950.

This invention relates to a new and improved film holder for use in photographic cameras.

In order that the principle of the invention may be readily understood, I have disclosed a single embodiment thereof in the accompanying drawings, wherein—

Figs. 1 and 2 are perspective views of the lower left-hand corner and lower right-hand corner respectively of the film holder with the lower flap or hinged cover member in open position.

Fig. 3 is an enlarged, vertical section through the lower part only of the film holder and showing one of the flaps or hinged cover members turned outwardly into open position, one of the dark slides having been removed;

Fig. 4 is a similar view on a smaller scale, but showing both the flaps or hinged cover member in closed position and both dark slides in place in the holder;

Fig. 5 is an inside elevation, partly broken away, of the flap or hinged cover member of the film holder;

Fig. 6 is a right hand end view of Fig. 5; and

Fig. 7 is a bottom view of Fig. 5, partly broken away.

There has been developed in the last few years sensitized material of much greater light sensitivity than heretofore. Because of this increased light sensitivity of the sensitized material, it has become increasingly difficult to manufacture a film holder that is light-tight under all operating conditions. Nevertheless the film holder constituting my invention not only meets the conditions for preventing light leaks in the film holder, but at the same time provides a structure that is unusually simple to manufacture and that can be built at reasonable cost. The structural members of the film holder are moldings that can be reproduced either in metal or in several of the well-known plastic materials.

Among the objects of the invention are: to provide a film holder that can be absolutely light-tight and to provide a flap or hinged cover member used for loading sensitized material into the film holder of the new and improved construction.

Referring to Figs. 3 and 4, fitted between the castings 20 and 21 is a separator plate indicated at 25. The said castings 20 and 21 have grooves cast therein, indicated at 20a and 21a, for receiving the separator plate 25. Attached to the said separator plate 25 are film septums 26 and 27.

The lower ends of the castings 20 and 21 are provided, as best shown in Fig. 1, with cut-outs, indicated at 43, to provide an easy means for inserting sheet film in septums 26 and 27.

An important feature of my invention resides in the lower holder flaps or hinged members of the holder, which I will now describe. I have provided a novel construction for the lower holder flaps or hinged members that permits constructing a holder that is absolutely light-tight even when using the most sensitized materials now known.

In Fig. 5 is shown an inside plan view of one of the lower flaps or hinged members 23, 23a that are each made as a molding and are of identical but reversed construction.

An end view of the flap is shown in Fig. 6 and a top view thereof in Fig. 7. With the usual construction of holder flaps, it has been impossible to render them thoroughly light-tight, but I have changed the construction in important respects to secure additional and absolutely effective light locks.

In Figs. 3 and 4, it will be noted that the bottom portion of each of the castings 20 and 21 is cut away at an angle, indicated at 44, and the corresponding flap is also constructed with a mating angle indicated at 45. While my invention is not limited to the precise angles shown (30°), they have been found in practice to be completely effective. This not only provides an additional light lock, but also a much superior hinge. In the usual structure heretofore employed, the hinge breaks at a sharp corner, and in a very short time the hinge material, indicated at 24 (Figs. 3 and 4), becomes so deteriorated as to allow the hinge to break. Such a construction is shown in the patent to W. F. Folmer, No. 1,641,420, September 6, 1927, where, as shown in Fig. 4, the doors 5 have also ends which are flush, when the doors are closed, with the lower face of the bottom 5', and together present a bottom edge more than equalling the edge of the bottom 5', so that the fabric has a smuch smaller area of contact with the face of the bottom 5' than in my construction, and moreover is very likely to be torn therefrom when the door 5 is sharply folded back as shown in Fig. 4 of said patent.

The prior art is also well exemplified by the construction shown in the patent to Schaub 603,972, May 10, 1898. Therein are provided at the lower end of the holder two end pieces or sections 7, 7, each being parallel sided and extending, in essentially full thickness, to the bottom of the end piece or section 4, where there is applied a flexible strip 8. Thus the end piece or section 4 has a thickness which is only one half of that of the side pieces or sections 1, and consequently the area of attachment of the flexible strip 8 is only one-half of that in my construction wherein each of the two end pieces 20, 21 constituting the body member is at its bottom face of full depth or thickness, and together they present an area for attachment of the flexible strip 24 which is of the entire thickness of the holder, and therefore the risk is greatly lessened of pulling the flexible strip 24 away from the lower faces of the castings 20, 21, when the flaps 23, 23a are swung back and forth, as they must be every time a film is removed and another inserted. Moreover, the flaps 23, 23a at their ends terminate slightly short of the lateral edge faces of the holders. This is evident from Figs. 1 and 2, which show that the two castings 20, 21 at the lateral edges of the outer faces extend in full thickness to the very bottom of the holder. This provides against the entrance of light at the opposite ends of the flaps, as those ends fit closely inside of and against the cut away lower inner edges of the structure of the castings 20, 21. Moreover, at the inner faces of the flaps 23, 23a they have formations, subsequently herein described, which serve most effectively to exclude light and which construction is entirely lacking in the patent to Schaub where, as is very evident from Fig. 4, each end piece or section 7 is of the full length of the width of the holder, and light is apt to find its way between these parts at the two lower corners at the lower end of the holder.

Because of my novel construction, there is provided considerable material at the hinge, indicated at 46, that is not coated with an adhesive and which provides a looseness at the hinge point that permits each holder flap to have a much freer working hinge, as clearly shown at the right in Fig. 3, and moreover the flaps 23, 23a can be folded entirely back against the lower end of the holder without in any way injuring the hinge. This provides a longer wearing hinge and makes it considerably easier to load the holder.

The hinge member is also provided with a groove 47 for receiving the corresponding dark slide 33 and an additional step 48 for engaging a notch 49 in the holder casting, as shown in Figs. 1 and 2.

As shown in Figs. 5, 6 and 7, a second step 50 is provided in each of the flaps 23 and 23a that engages a mating cut-out or step 51 in each of the castings 20 and 21, indicated in dotted lines at the right of Fig. 7 and constituting a part of such figure. A boss 52 is provided on each of the said flaps for engaging a correspondingly shaped recess or depression 53 provided therefor in each of the castings 20 and 21 (also indicated at the right of Fig. 7), and the septums 26 and 27 serve as one wall of such recess, as shown most clearly in Fig. 4. The described construction constitutes an additional light break and prevents light entering from any direction or at any angle. A recess or step 54 is provided in the flaps 23 and 23a at the top of the inner faces thereof and extending longitudinally thereof to engage the lower end of the sheet films when said flaps are in the position shown in Fig. 4.

Having thus described one illustrative embodiment of the invention, it is to be understood that although specific terms are employed, they are used in a generic or descriptive sense, and not for purposes of limitation, the scope of the invention being set forth in the following claims.

I claim:

1. A film holder for photographic cameras comprising a rectangular body member having at its lower end two opposite hinged member flaps grooved at their upper edges to receive the lower ends of dark slides, said body member having two cut-out steps 51 respectively extending lengthwise of the longitudinal edge portions of said body member near the lower ends of said edge portions, and each of said hinged member flaps having a step to engage the corresponding cut out step 51 of said body member, such two steps of such hinged member flap being respectively positioned at each of the extreme outer edges thereof and each such hinged member step extending in an upward direction to engage the corresponding step 51 of said body member, thereby cooperating in providing a light-tight construction.

2. A film holder for photographic cameras comprising a rectangular body member having at its lower end two opposite hinged member flaps grooved at their upper edges to receive the lower ends of dark slides, said body member having two notches 49 respectively adjacent the upper end of the positioned corresponding hinged member flap and respectively extending inward near the lower end of a longitudinally extending edge portion of such body member and such flap having two steps located respectively at the upper ends of the extreme lateral edges of such flap so as to mate with said notches, each of said mating members having two cut-out steps 51 respectively extending lengthwise of the longitudinal edge portions of said body member near the lower ends of said edge portions, and each of said hinged member flaps having a step to engage the corresponding cut out step 51 of said body member, such two steps of such hinged member flap being respectively positioned at each of the extreme outer edges thereof and each such hinged member step extending in an upward direction to engage the corresponding step 51 of said body member, thereby cooperating in providing a light-tight construction.

3. A film holder for photographic cameras comprising a rectangular body member having at its lower end two opposite hinged member flaps grooved at their upper edges to receive the lower ends of dark slides, said body member having at each face thereof two prolonged bosses 52 respectively positioned at the two extreme lateral edges of the corresponding flap and extending lengthwise of such edges and said body member at each face having two prolonged recesses 53 positioned at the lower part of the two edge portions of such body member to engage respectively said bosses so as further to cooperate in providing a light-tight construction.

4. A film holder for photographic cameras comprising a rectangular body member having at its lower end two opposite hinged member flaps grooved at their upper edges to receive the lower ends of dark slides, said body member having two notches 49 at each face thereof respectively adjacent the upper end of the positioned corresponding hinged member flap and respectively extending inward near the lower end of a longitudinally extending edge portion of such body member, and such flap having two steps located respectively at the upper ends of the extreme lateral edges of such flap so as to mate with said notches, said body member at each face having two cut-out steps 51 respectively extending lengthwise of the longitudinal edge portions of said body member near the lower ends of said edge portions and each of said hinged member flaps having a step to engage the corresponding cut out step 51 of said body member, such two steps of such hinged member flap being respectively positioned at each of the extreme outer edges thereof and each such hinged member step extending in an upward direction to engage the corresponding step 51, thereby cooperating in providing a light-tight construction, each of said hinged member flaps having two prolonged bosses 52 respectively positioned at the two extreme lateral edges of such flap and extending lengthwise of such edges, and each face of said body member having two prolonged recesses 53 positioned at the lower part of the two edge portions of such body member to engage respectively said bosses 52 so as further to cooperate in providing a light-tight construction.

5. A film holder for photographic cameras comprising a rectangular body member said film holder having at the lower end thereof two opposite flaps each hinged at its lower end to the lower end of the body member, so as to be swung outwardly and downwardly from an upright position, each of said hinged flaps having an upwardly facing groove in its upper edge to receive the lower end of a dark slide, said two hinged flaps each extending from the inner edge of one side part of the body member to the inner edge of the opposite side part of the same face of said body member, so that when turned upward and inward into dark slide receiving position, each hinged flap engages at its lateral edges the inner faces of the side parts of a face of said body member, each of said hinged flaps at its upper edge having an upward continuation 48 at its outer face, each face of said body member having an inwardly extending recess 49 located and complementarily shaped to receive with a close fit the corresponding upward continuation 48, each of said two hinged flaps having closely adjacent each lateral edge an inwardly-extending elongated boss 52, each of the faces of said body member having correspondingly shaped depressions 53 into which the corresponding boss fits when the hinged flaps are in their dark slide receiving position, each of said hinged flaps having at both of its extreme lateral edges, laterally beyond the bosses 52, a projecting step formation 50, and each of the upright sides of the said body member having a cut-out 51 complementary to and positioned to receive with a close fit the corresponding step formation 50, when the hinged flaps are in dark slide receiving position.

6. A film holder for photographic cameras comprising a rectangular body member said film holder having at the lower end thereof two opposite flaps each hinged at its lower end to the lower end of the body member, so as to be swung outwardly and downwardly from an upright position, each of said hinged flaps having an upwardly facing groove in its upper edge to receive the lower end of a dark slide, said two hinged flaps each extending from the inner edge of one side part of the body member to the inner edge of the opposite side part of the same face of said body member, so that when turned upward and inward into dark slide receiving position, each hinged flap engages at its lateral edges the inner face of the side parts of the same face of said body member, each of said hinged flaps at its upper edge having an upward continuation 48 at its outer face, each face of said body member having an inwardly extending recess 49 located and complementarily shaped to receive with a close fit the corresponding upward continuation 48, each of said two hinged flaps having closely adjacent each lateral edge an inwardly extending elongated boss 52, each of the faces of said body member having correspondingly shaped depressions 53 into which the corresponding boss fits when the hinged flaps are in their dark slide receiving position.

7. A film holder for photographic cameras comprising a rectangular body member said film holder having at the lower end thereof two opposite flaps each hinged at its lower end to the lower end of the body member, so as to be swung outwardly and downwardly from an upright position, each of said hinged flaps having an upwardly facing groove in its upper edge to receive the lower end of a dark slide, said two hinged flaps each extending from the inner edge of one side part of a face of the said rectangular body member, to the inner edge of the opposite side part of said face of said rectangular body member so that when turned upward and inward into dark slide receiving position, each hinged flap engages at its lateral edges the inner faces of the side parts of the corresponding face of said body member, each of said hinged flaps at its upper edge having an upward continuation 48 at its outer edge, each face of said body member having an inwardly extending recess 49 located and complementarily shaped to receive with a close fit the corresponding upward continuation 48, each of said hinged flaps having bosses 52 and at both of its extreme lateral edges, laterally beyond the bosses 52, having a projecting step formation 50, and each of the faces of said body member having a cut-out 51 complementary to and positioned to receive with a close fit the corresponding step formation 50, when the hinged flaps are in dark slide-receiving position.

8. A film holder for photographic cameras comprising a rectangular body member, two dark slides received therein, a separator plate between inserted dark slides, said film holder having means to support a sheet film at each of the faces of the separator plate, said film holder having at the lower end thereof two opposite hinged member flaps grooved at their upper edges to receive the lower ends of the respective dark slides, each of said hinged member flaps having at the inner face thereof at its upper end a recess or step 54 extending longitudinally of such face to engage the lower end of the corresponding sheet films when the said hinged member flaps are in their closed position.

9. A film holder for photographic cameras in accordance with claim 8, wherein each of said recesses or steps extends uninterrupted the entire distance between the opposite lateral edges of such hinged member flaps.

10. A film holder for photographic cameras comprising a rectangular body member having a separator plate mounted centrally therein which is adapted to receive two sensitized surfaces in a back to back relation, said body member being at its actual bottom of the full thickness of the body member, said body member having two side faces at the extreme lower end thereof sloping inwardly upward from the extreme lower full thickness end of the body member, said sloping faces at their upper ends each merging into and terminating in a horizontal shoulder extending inward to said separation plate, and two opposite flaps each having its inner face sloping from a thin edge upwardly and inwardly to complement or mate with the said slope of each lower side face of the body member, the said flaps each having at the upper end of its sloping face an inwardly extending horizontal shoulder mating with the corresponding horizontal shoulder of the body member, and a flexible hinge strip applied flatwise to and secured to the entire area of the lower end of the holder and extending flatwise onto and secured to the lower part of the outer face of each of said flaps, the said flaps each having at its upper edge a groove-like formation to receive the lower edge of a dark slide.

11. A film holder for photographic cameras in accordance with claim 10, wherein both the inwardly sloping faces of said body member terminate laterally at their ends a short distance from the extreme outer side edges of said holder, and wherein the body member is of full thickness at its lower end laterally beyond the ends of said inwardly sloping faces, and wherein each of the said hinged flaps terminates at its ends at the lateral terminals of said inwardly sloping faces of said body member and thereby provide a light-tight construction at the meeting areas of the said ends of the flaps and the outer side positions of the body member.

12. A film holder for photographic cameras in accordance with claim 10, wherein each of said hinged flaps at both of its extreme lateral edges at the inner face thereof is shaped or reduced in thickness and the outer faces of the said body member at the corresponding points is correspondingly recessed to provide a face and shoulder against which said shaped and recessed portions at the lateral edges of said hinged flaps seat and match.

13. A film holder for photographic cameras in accordance with claim 10, wherein each of said hinged flaps at both of its extreme lateral edges at the inner face thereof is recessed or reduced in thickness and the outer faces of the said body member at the corresponding points is correspondingly shaped to provide a face and shoulder against which said shaped and recessed portions at the lateral edges of said hinged flaps seat and match, the said hinged flaps both terminating laterally short of the extreme lateral edges of the body member, so as to provide a light-tight fit with the ends of the said hinged flaps.

14. A film holder for photographic cameras comprising a rectangular body member adapted to receive two sensitized surfaces in a face-to-face relation, said body member being at its actual bottom of the full thickness of the body member, each face of said body member having a notch 49 extending inwardly at the inner lower part of its side toward the position of the inserted sensitized surface, thereby to provide a prolongation parallel with and adjoining such an inserted sensitized surface, the said film holder having two flaps hinged respectively at the said faces of said body member, at its lower end, each of said hinged flaps having at each end a step 48 forwardly extending from the upper edge of such hinged flap in longitudinal parallelism with and in contact with the outer face of the said adjacent prolongation when the flaps are in functioning position.

JAMES S. PANOSIAN.

REFERENCES CITED

The following references are of record in the file of this patent:

UNITED STATES PATENTS

| Number | Name | Date |
|---|---|---|
| 603,972 | Schaub | May 10, 1898 |
| 2,410,919 | Aiken | Nov. 12, 1946 |